United States Patent [19]

Hanaway

[11] Patent Number: 5,865,416
[45] Date of Patent: Feb. 2, 1999

[54] SECURITY TIE DOWN

[76] Inventor: John Hanaway, 296 Bermuda La., Vallejo, Calif. 94951

[21] Appl. No.: 854,747

[22] Filed: May 12, 1997

[51] Int. Cl.[6] .................................................. F16M 13/00
[52] U.S. Cl. ......................... 248/551; 248/903; 248/552; 24/16 PB; 24/457
[58] Field of Search .................................... 248/551, 552, 248/231.91, 903; 411/400, 401, 910, 338, 82; 24/16 PB, 457, 30.5 R

[56] References Cited

U.S. PATENT DOCUMENTS

| | | | |
|---|---|---|---|
| 1,476,834 | 12/1923 | Pleister . | |
| 3,850,014 | 11/1974 | Flack | 70/53 |
| 3,881,680 | 5/1975 | Lietaert, Jr. | 248/499 |
| 4,025,014 | 5/1977 | Larson | 248/203 |
| 4,050,583 | 9/1977 | Szabo | 211/20 |
| 4,118,902 | 10/1978 | Saxton | 52/27 |
| 4,295,765 | 10/1981 | Burke | 410/101 |
| 4,974,889 | 12/1990 | North | 292/259 |
| 5,193,480 | 3/1993 | Garrett | 116/200 |
| 5,301,817 | 4/1994 | Merritt | 211/5 |
| 5,372,532 | 12/1994 | Robertson, Jr. | 441/1 |
| 5,487,288 | 1/1996 | Frantz | 70/259 |
| 5,516,053 | 5/1996 | Hannu | 241/207 |

FOREIGN PATENT DOCUMENTS 0332397  10/1903  France ................................. 411/400

*Primary Examiner*—Leslie A. Braun
*Assistant Examiner*—Kimberly Wood
*Attorney, Agent, or Firm*—Jack Lo

[57] ABSTRACT

A security tie down includes a threaded sleeve embedded in a ground surface, and a steel eyebolt screwed into the sleeve. An object for being secured, such as a vehicle, is tied to a ring of the eyebolt with a locked cable. The eyebolt includes hard faced welded beads welded thereon for resisting cutting. When not in use, the eyebolt may be unscrewed to avoid tripping passersby, and a threaded plug may be screwed into the sleeve to exclude dirt.

12 Claims, 3 Drawing Sheets

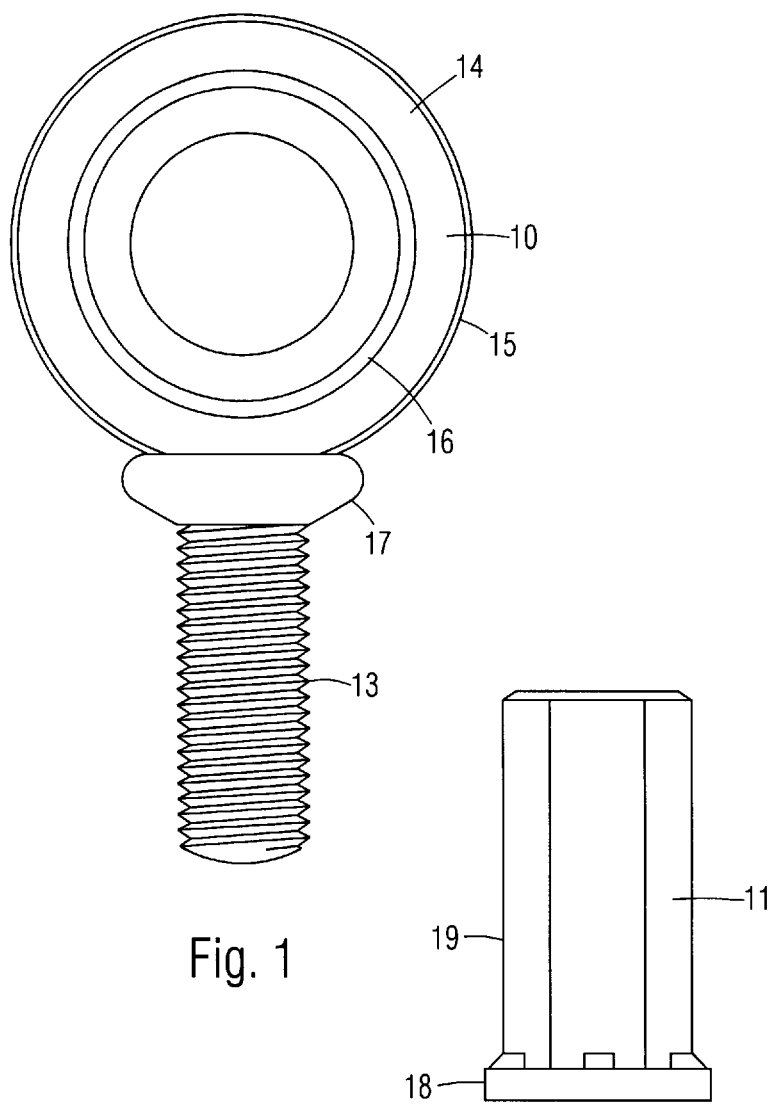
Fig. 1
Fig. 2
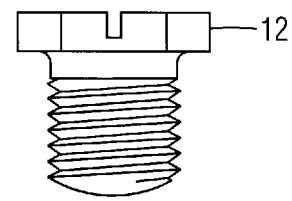
Fig. 3

SECURITY TIE DOWN

BACKGROUND OF THE INVENTION

1. Field of the Invention

This invention relates generally to tie downs for tying down objects to the ground.

2. Prior Art

Tie downs are commonly used for tying a vehicle, such as an aircraft, to the ground to secure it against high winds and theft. A typical tie down includes a depression formed on a concrete surface, and an arcuate bar embedded in the concrete across the opening of the depression. A vehicle is parked near the tie down, and connected to it with a cable or chain. However, such a tie down must be made when the concrete is poured, so that it cannot be easily retrofitted. The steel bars used are often not strong enough to withstand conventional cutting tools. Further, the depression tends to collect dust and dirt, so that it may eventually be filled, which makes looping the wire or chain under the bar difficult.

OBJECTS OF THE INVENTION

Accordingly an object of the present invention is to provide a security tie down for securing an object to an immobile structure.

Another object of the present invention is to provide a security tie down that is easily retrofitted to an existing concrete surface.

Another object of the present invention is to provide a security tie down that is strong enough to resist tampering.

Another object of the present invention is to provide a security tie down that is removable when not in use to eliminate it as a tripping hazard.

Still another object of the present invention is to provide a security tie down that resists dirt to minimize cleaning.

Further objects of the present invention will become apparent from a consideration of the drawings and ensuing description.

BRIEF SUMMARY OF THE INVENTION

A security tie down includes an internally threaded anchor sleeve epoxied into a hole drilled into a concrete surface. A steel eyebolt is screwed into the sleeve. A vehicle parked nearby is secured by looping a cable means around or through an aperture in the vehicle, threading one end of the cable means through the eyebolt, and locking the ends of the cable means together. The eyebolt is strengthened by hard faced welded beads arranged thereon, so that it resists cutting. When not in use, the eyebolt may be removed to prevent tripping passers-by, and a plug may be screwed into the sleeve to prevent dirt from entering the sleeve.

BRIEF DESCRIPTION OF THE SEVERAL VIEWS OF THE DRAWING

FIG. 1 is a side view of an eyebolt of a security tie down in accordance with the invention.

FIG. 2 is a side view of an anchor sleeve of the security tie down.

FIG. 3 is a side view of an anchor sleeve plug of the security tie down.

Drawing Reference Numerals

Figure 4:
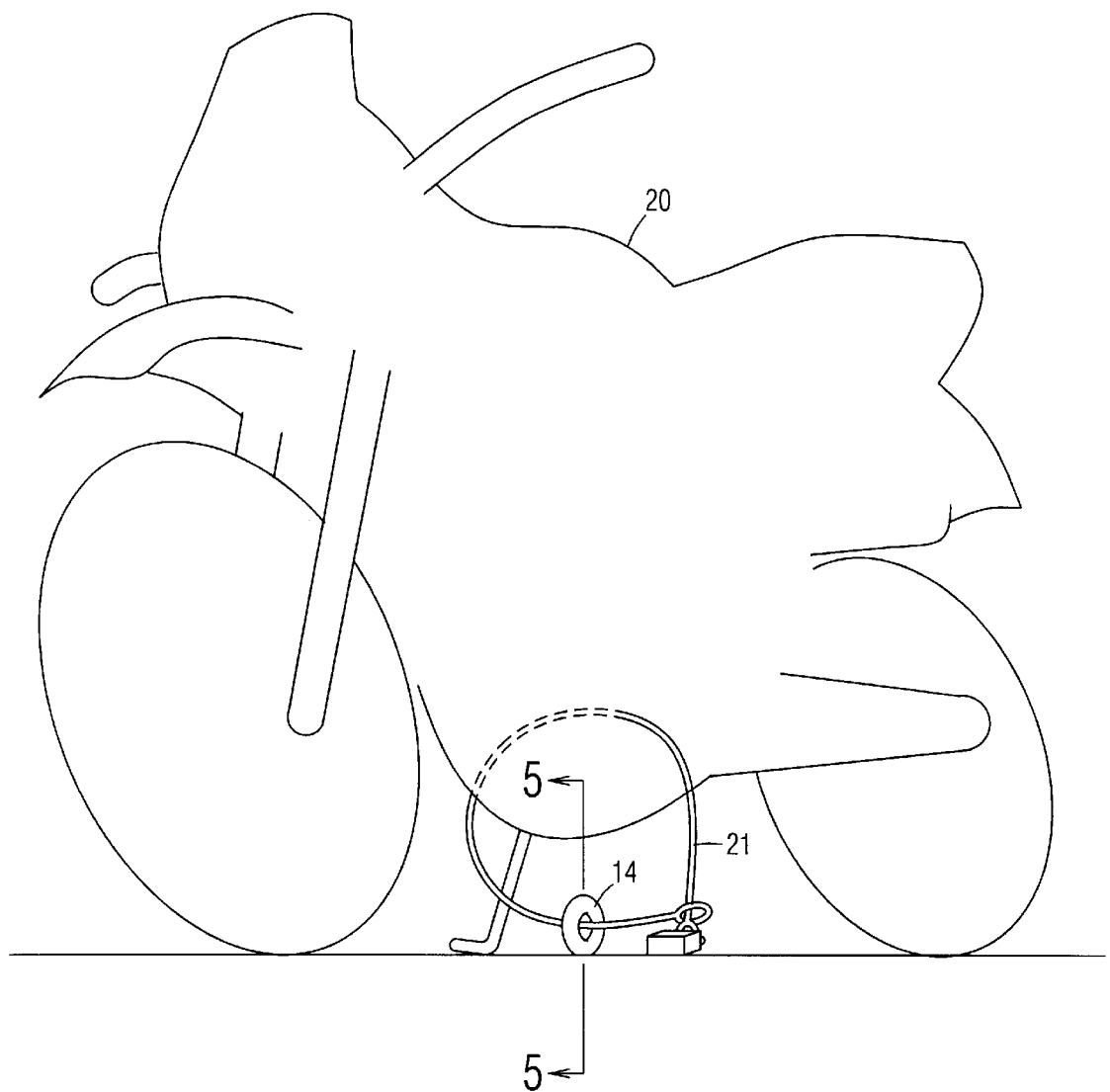
FIG. 4 is a side perspective of the security tie down in use.

| | |
|---|---|
| 10. Eyebolt | 11. Anchor Sleeve |
| 12. Anchor Sleeve Plug | 13. Threaded Shaft |
| 14. Ring | 15. Welded Bead |
| 16. Welded Bead | 17. Shoulder |
| 18. Closure | 19. Tube |
| 20. Vehicle | 21. Cable Means |
| 22. Hole | 23. Ground |
| 24. Epoxy | 25. Tapered Opening |

DETAILED DESCRIPTION OF THE INVENTION

FIGS. 1–3

In accordance with a preferred embodiment of the invention shown in the side views of FIGS. 1–3, a security tie down includes a steel eyebolt 10, a steel tubular anchor sleeve 11, and an anchor sleeve plug 12. Eyebolt 10 includes a threaded shaft 13 extending from a ring 14. Hard faced welded beads 15 and 16, which are welded with hard faced welding rods, surround ring 14 in concentric circles. A hard faced welded shoulder 17, also welded with hard faced welding rods, is positioned between shaft 13 and ring 14. Tubular anchor sleeve 11 includes a closure 18 welded to the bottom of an internally threaded tube 19 with a hexagonal outer surface. Plug 12 simply comprises a short bolt.

FIG. 4

The security tie down is shown in use in the side perspective view in FIG. 4. It is installed in the ground, and an object for being secured, such as a motorcycle 20, is tied to ring 14 by a locked cable means 21.

FIGS. 5–6

Figure 5:
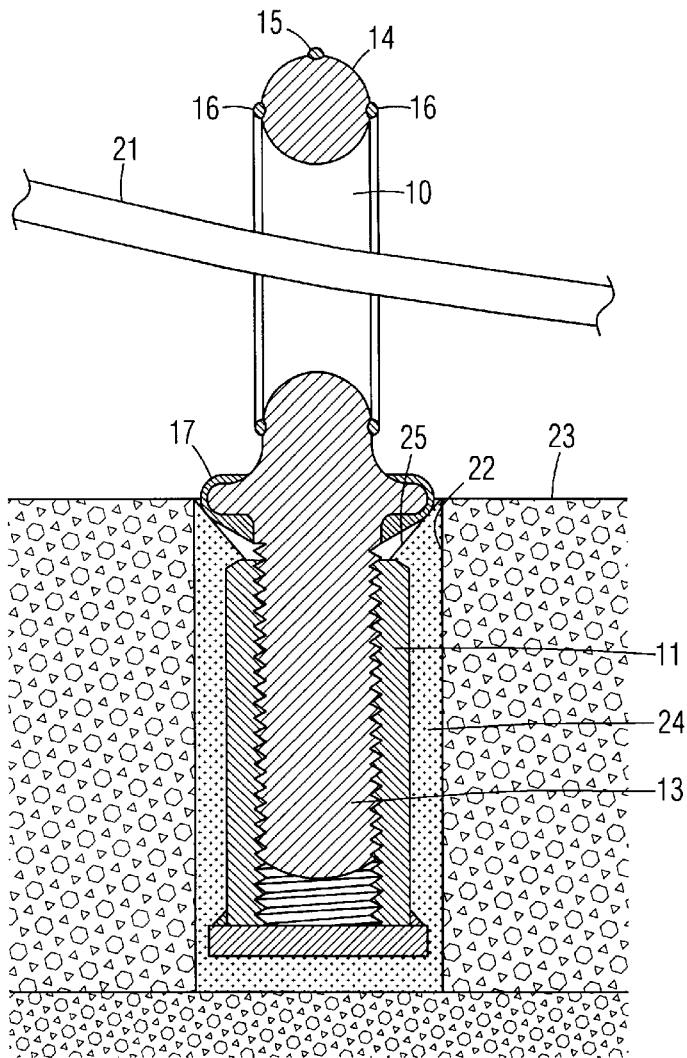
FIG. 5 is a side sectional view of the security tie down, taken along line 5—5 in FIG. 4.
Figure 6:
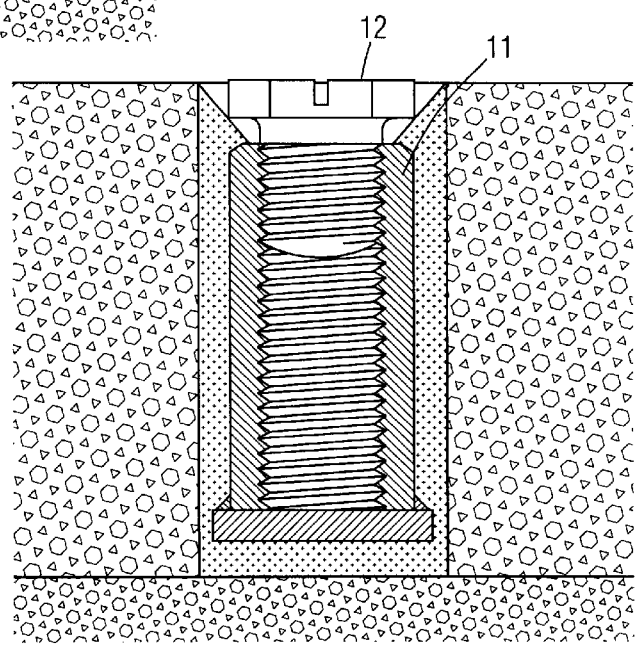
FIG. 6 is a partial sectional view of the security tie down with the anchor sleeve plug installed.

As shown in the sectional view of FIG. 5, sleeve 11 is attached within a hole 22 drilled into an immobile structure or concrete ground 23, preferably by construction-grade epoxy 24, which is formed with a tapered opening 25. Eyebolt 10 is screwed fully into sleeve 11, so that shoulder 17 is seated within tapered opening 25. Hard faced welded beads 15 and 16 are hard enough to prevent ring 14 from being cut, and hard faced welded shoulder 17 also resists cutting. Although the portions of ring 14 between the welded beads may be cut, the plurality of welded beads substantially limit the cutting depth. Although eyebolt 10 is removably attached to sleeve 11, cable means 21 prevents its removal by preventing ring 14 from being rotated more than about half a turn, since the heavy object to which cable means 21 is connected cannot be easily lifted and rotated. When eyebolt 10 is not in use, it may be unscrewed from sleeve 11 to eliminate it as a tripping hazard, and plug 12 may be installed in sleeve 11 to exclude dirt, as shown in FIG. 6.

SUMMARY AND SCOPE

Accordingly, I have provided a security tie down for securing an object to an immobile structure. It is easily retrofitted to an existing concrete surface. It is strong enough to resist tampering. It is easily removable when not in use to eliminate it as a tripping hazard, and it resists dirt for minimizing cleaning.

Although the above descriptions are specific, they should not be considered as limitations on the scope of the invention, but only as examples of the embodiments. Many substitutes and variations are possible within the teachings of the invention. For example, the tie down may be made of other materials, such as tungsten. The eyebolt may be fixedly installed in the immobile structure. The tie down may be installed in other immobile structures, such as a wall. The welded beads may be arranged in other patterns. More or fewer welded beads may be provided. The welded beads may be eliminated if the eyebolt is made of a sufficiently hard material that resists cutting. The cable means may be a steel cable, chain, or any other device for attaching an object to the tie down. More than one tie down may be used to secure an object, so that the object cannot be lifted and rotated at all to remove either eyebolt. The sleeve may be attached to an immobile structure with other methods, such as being embedded into wet concrete. Therefore, the scope of the invention should be determined by the appended claims and their legal equivalents, not by the examples given.

I claim:

1. A security tie down for securing an object to an immobile structure, comprising:

an eyebolt comprising a ring and a shaft extending from said ring, said shaft for being securely embedded in said immobile structure; and a hard faced welded substantially circular bead generally secured to an outer surface of said ring, said welded bead being elongated in a direction generally parallel to a circumference of said ring, said welded bead being hard enough to strongly resist being cut, said welded bead being harder than said ring and protruding from a surface of said ring to protect said ring from cutting, whereby said ring may be connected by a cable means to said object for securing said object to said immobile structure.

2. The security tie down of claim 1, further including a hard faced welded shoulder arranged between said ring and said shaft for resisting cutting.

3. The security tie down of claim 1, further including a tubular anchor sleeve for being securely embedded in said immobile structure, said shaft of said eyebolt being removably secured within said sleeve.

4. The security tie down of claim 1, further including a tubular anchor sleeve for being securely embedded in said immobile structure, said shaft of said eyebolt being removably secured within said sleeve, and a plug inserted into said sleeve when said eyebolt is removed from said sleeve, said plug for being positioned flush with a surface of said immobile structure.

5. A security tie down for securing an object to an immobile structure, comprising:

an eyebolt comprising a ring and a shaft extending from said ring, said shaft for being securely embedded in said immobile structure; and a hard faced welded bead arranged on said ring in a generally continuous circle concentric with said ring and secured to an outer surface of said ring, said welded bead being hard enough to strongly resist being cut, said welded bead being harder than said rind and protruding from a surface of said ring to protect said ring from cutting, whereby said ring may be connected by a cable means to said object for securing said object to said immobile structure.

6. The security tie down of claim 5, further including a hard faced welded shoulder arranged between said ring and said shaft for resisting cutting.

7. The security tie down of claim 5, further including a tubular anchor sleeve for being securely embedded in said immobile structure, said shaft of said eyebolt being removably secured within said sleeve.

8. The security tie down of claim 5, further including a tubular anchor sleeve for being securely embedded in said immobile structure, said shaft of said eyebolt being removably secured within said sleeve, and a plug inserted into said sleeve when said eyebolt is removed from said sleeve, said plug for being positioned flush with a surface of said immobile structure.

9. A security tie down for securing an object to an immobile structure, comprising:

an eyebolt comprising a ring and a shaft extending from said ring, said shaft for being securely embedded in said immobile structure; and a plurality of generally circular, hard faced welded beads arranged generally concentrically on said ring, one of said welded beads being generally secured to an outer surface of said ring on an outer circumference of said ring, and two of said welded beads being respectively secured to an outer surface of said ring on a front side and a back side of said ring, said welded beads being hard enough to strongly resist being cut, said welded beads being harder than said ring and protruding from a surface of said ring to protect said ring from cutting on a plurality of sides, whereby said ring may be connected by a cable means to said object for securing said object to said immobile structure.

10. The security tie down of claim 9, further including a hard faced welded shoulder arranged between said ring and said shaft for resisting cutting.

11. The security tie down of claim 9, further including a tubular anchor sleeve for being securely embedded in said immobile structure, said shaft of said eyebolt being removably secured within said sleeve.

12. The security tie down of claim 9, further including a tubular anchor sleeve for being securely embedded in said immobile structure, said shaft of said eyebolt being removably secured within said sleeve, and a plug inserted into said sleeve when said eyebolt is removed from said sleeve, said plug for being positioned flush with a surface of said immobile structure.

* * * * *